United States Patent [19]

Niiyama et al.

[11] Patent Number: 5,400,389
[45] Date of Patent: Mar. 21, 1995

[54] SYSTEM FOR REWRITING INFORMATION IN REWRITABLE MEMORY PROVIDED IN PORTABLE REMOTE TERMINAL AND PORTABLE REMOTE TERMINAL APPLICABLE TO THE SYSTEM

[75] Inventors: Manabu Niiyama; Minoru Sakata, both of Sendai, Japan

[73] Assignee: Fujitsu Limited, Kawasaki, Japan

[21] Appl. No.: 63,414

[22] Filed: May 18, 1993

[30] Foreign Application Priority Data

May 19, 1992 [JP] Japan ................................. 4-125886

[51] Int. Cl.$^6$ ............................................. H04M 11/00
[52] U.S. Cl. .................... 379/58; 455/186.1; 455/89
[58] Field of Search ................ 379/58, 59, 61, 63; 455/89, 186.1, 186.2

[56] References Cited

U.S. PATENT DOCUMENTS 4,525,865 6/1985 Mears ................................ 455/186.2
4,593,155 6/1986 Hawkins ............................ 455/88

FOREIGN PATENT DOCUMENTS 61-220535 9/1986 Japan .
62-38624 2/1987 Japan .
3-172031 7/1991 Japan .

*Primary Examiner*—Curtis Kuntz
*Assistant Examiner*—I. S. Rana

[57] ABSTRACT

A system includes a portable remote terminal for communicating with other terminal devices and an external unit for inputting information. The portable remote terminal has a connector for connecting the portable remote terminal to the external unit, a flash memory for storing information used in the portable remote terminal, a debugging tool area provided with the flash memory, the debugging tool area storing a program in accordance with which the information stored in the flash memory is rewritten, and a controller for rewriting the information stored in the flash memory so as to be information, input by the external unit and supplied from the external unit via the connector, the rewriting being in accordance with the program stored in the debugging tool area of the flash memory.

21 Claims, 10 Drawing Sheets

| INSTRUCTION | DATA | MONITOR(DISPLAY) | NOTE |
|---|---|---|---|
| BYTE MODE | 01H | 01H | VALID BEFORE SETTING MODE |
| PAGE MODE | 02H | 02H | VALID BEFORE SETTING MODE |
| END | 03H | 03H | |
| CONTINUATION | 04H | 04H | |
| ERASURE | 05H | 05H | VALID AFTER INPUT ADDRESS |
| DATA INPUT | 06K | 06H | INPUT DATA AFTER THIS COMMAND |
| PROGRAMMING | 07H | 07H | VALID AFTER INPUT DATA |
| VERIFY | 08H | 08H | VARIFY CONTENTS OF PROGRAM |
| RESET | FFH | FFH | |

SYSTEM FOR REWRITING INFORMATION IN REWRITABLE MEMORY PROVIDED IN PORTABLE REMOTE TERMINAL AND PORTABLE REMOTE TERMINAL APPLICABLE TO THE SYSTEM

BACKGROUND OF THE INVENTION

1. Field of the Invention

The present invention generally relates to a system for rewriting information in a rewritable memory provided in a portable remote terminal, such as a portable telephone, and to a portable remote terminal applicable to the system, and more particularly to a system in which a program in a rewritable memory can be rewritten under a condition in which the rewritable memory is mounted in the portable remote terminal.

Portable telephones, which are one type of portable remote terminal, have been spread in some years ahead, and have been greatly miniaturized. Due to miniaturization of parts of the portable telephone and to a technique by which many parts are mounted in a narrow area, the miniaturization of the portable telephone has been achieved. The portable telephone is controlled by a CPU (a micro computer) carrying out processes in accordance with programs stored in a program memory. In a case where functions of the portable telephone are to be changed, the programs in the program memory must be rewritten.

2. Description of the Related Art

In a portable telephone, a ROM device (Read Only Memory Integrated Circuit) is used as a program memory in which programs are to be stored. The following ROM devices are mounted in the portable telephone; an EPROM (Erasable and Programable ROM), a ROM which is programmable only once (so called a one-time ROM), a mask ROM which is programmable by wiring in the IC, and the like. These ROM devices are mounted on sockets fixed on printed circuit boards.

A ROM device is removed from a socket, and a program stored in the ROM device is then rewritten. In a case of a ROM device in which a program is not rewritable, such as a one-time ROM or a mask ROM, the ROM device is replaced by a new one in which an updated program has been stored. In a case of an EPROM, a ROM eraser erases a program in the EPROM using ultraviolet radiation, and a ROM writer electrically writes a new program in the EPROM.

A space required for mounting the conventional program memory on a printed circuit board with a socket is greater than that required for directly mounting the program memory on a printed circuit board without a socket. That is, miniaturization of the personal telephone is hampered by the socket on which the program memory is to be mounted. The program stored in the program memory may be rewritten after the portable telephone has been manufactured. Thus, if the program memory is directly soldered on the printed circuit board without a socket, the program memory soldered on the printed circuit board must be removed therefrom in order to rewrite the program in the program memory. In this case, it is not easy to remove the program memory from the printed circuit board.

SUMMARY OF THE INVENTION

Accordingly, a general object of the present invention is to provide a novel and useful system for rewriting information in a rewritable memory in a portable remote terminal and a portable remote terminal applicable to the system in which the disadvantages of the aforementioned prior art are eliminated.

A more specific object of the present invention is to provide a system in which information in a rewritable memory mounted in a portable remote terminal can be rewritten without removing the rewritable memory from the portable remote terminal.

The above objects of the present invention are achieved by a system comprising: a portable remote terminal for communicating with other terminal devices; and an external unit for inputting information, wherein the portable remote terminal comprises; a connector for connecting the portable remote terminal to the external unit, rewritable memory means for storing information used in the portable remote terminal, debugging tool memory means for storing a program in accordance with which the information stored in the rewritable memory means is rewritten, and rewriting means, coupled to the rewritable memory means and the debugging tool memory means, for rewriting the information stored in the rewritable memory means so as to be information, input by the external unit and supplied from the external unit via the connector, in accordance with the program stored in the debugging tool memory means.

Another object of the present invention is to provide a portable remote terminal in which information in a rewritable memory can be rewritten without removing the rewritable memory from the portable remote terminal.

The objects of the present invention are achieved by a portable remote terminal for communicating with other terminal devices, the portable remote terminal comprising: a connector for connecting the portable remote terminal to an external unit, rewritable memory means for storing information used in the portable remote terminal, debugging tool memory means for storing a program in accordance with which the information stored in the rewritable memory means is rewritten, and rewriting means, coupled to the rewritable memory means and the debugging tool memory means, for rewriting the information stored in the rewritable memory means so as to be information, input by the external unit connected by the connector and supplied from the external unit via the connector, in accordance with the program stored in the debugging tool memory means.

According to the present invention, as the portable remote terminal is provided with the debugging tool memory storing the program in accordance with which information stored in the rewritable memory means is rewritten, the information in the rewritable memory mounted can be rewritten without removing the rewritable memory from the portable remote terminal. Thus, the rewritable memory can be directly soldered on a circuit board. As a result, the portable remote terminal can be miniaturized.

Additional objects, features and advantages of the present invention will become apparent from the following detailed description when read in conjunction with the accompanying drawings.

DESCRIPTION OF THE PREFERRED EMBODIMENTS

A description will now be given of an embodiment of the present invention.

Figure 1:
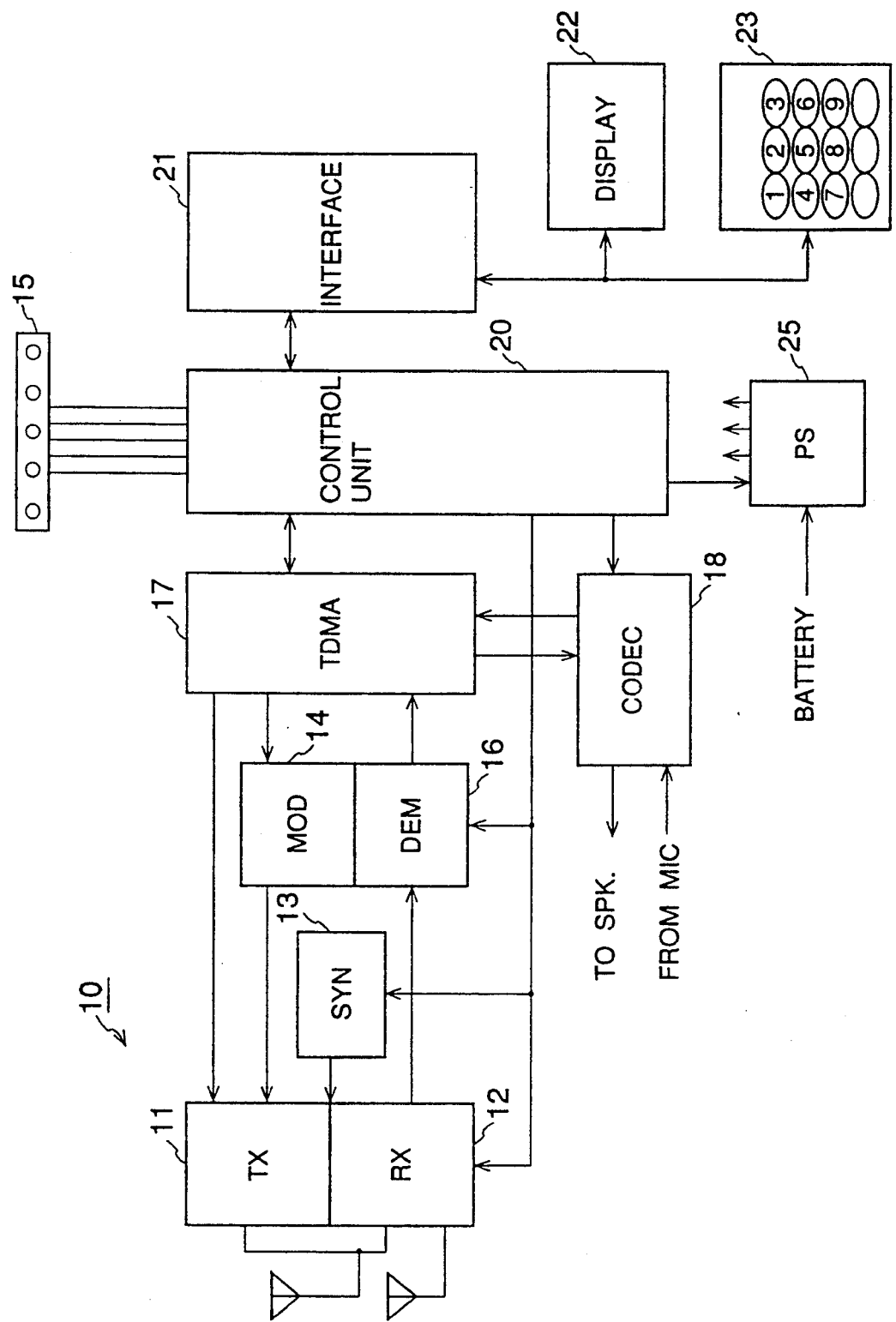
FIG. 1 is a block diagram illustrating a portable telephone according to an embodiment of the present invention.

Referring to FIG. 1, which shows an essential construction of a portable telephone 10. The portable telephone 10 has a transmitter 11, a receiver 12, a synchronizing circuit 13, a modulator 14, a demodulator 16, a multiplexer/demultiplexer 17, a coder/decoder (CODEC) 18 and a control unit 20. The coder/decoder 18 is connected to a microphone, and a voice signal supplied from the microphone is coded by the coder/decoder 18. The coded voice signals are multiplexed by the multiplexer/demultiplexer 17 in accordance with a time-division multiplexing access (TDMA), and the multiplexed voice signal is supplied to the transmitter 11 via the modulator 14. The transmitter 11 transmits the voice signals in accordance with the time-division multiplexing (TDM) transmission. A voice signal received by the receiver 12 is supplied to the multiplexer 17 via the demodulator 16. The multiplexer/demultiplexer 17 demultiplexes the received voice signal and supplies signal components assigned to this portable telephone 10 to the coder/decoder 18. The signal components are decoded by the coder/decoder 18 and are supplied to the loudspeaker. Voices corresponding to the received voice signals are output from the loudspeaker.

The control unit 20 is connected to a display unit 22 and a key board 23 via an interface 21. The display unit 22 displays various information in accordance with instructions from the control unit 20. Telephone numbers and other information input by the key board 23 is supplied to the control unit 20 via the interface 21. The portable telephone 10 is provided with a power supply 25. The power supply 25 is connected to a battery and supplies electrical power to various parts of the portable telephone 10. The control unit is also connected to a connector 15.

Figure 2:
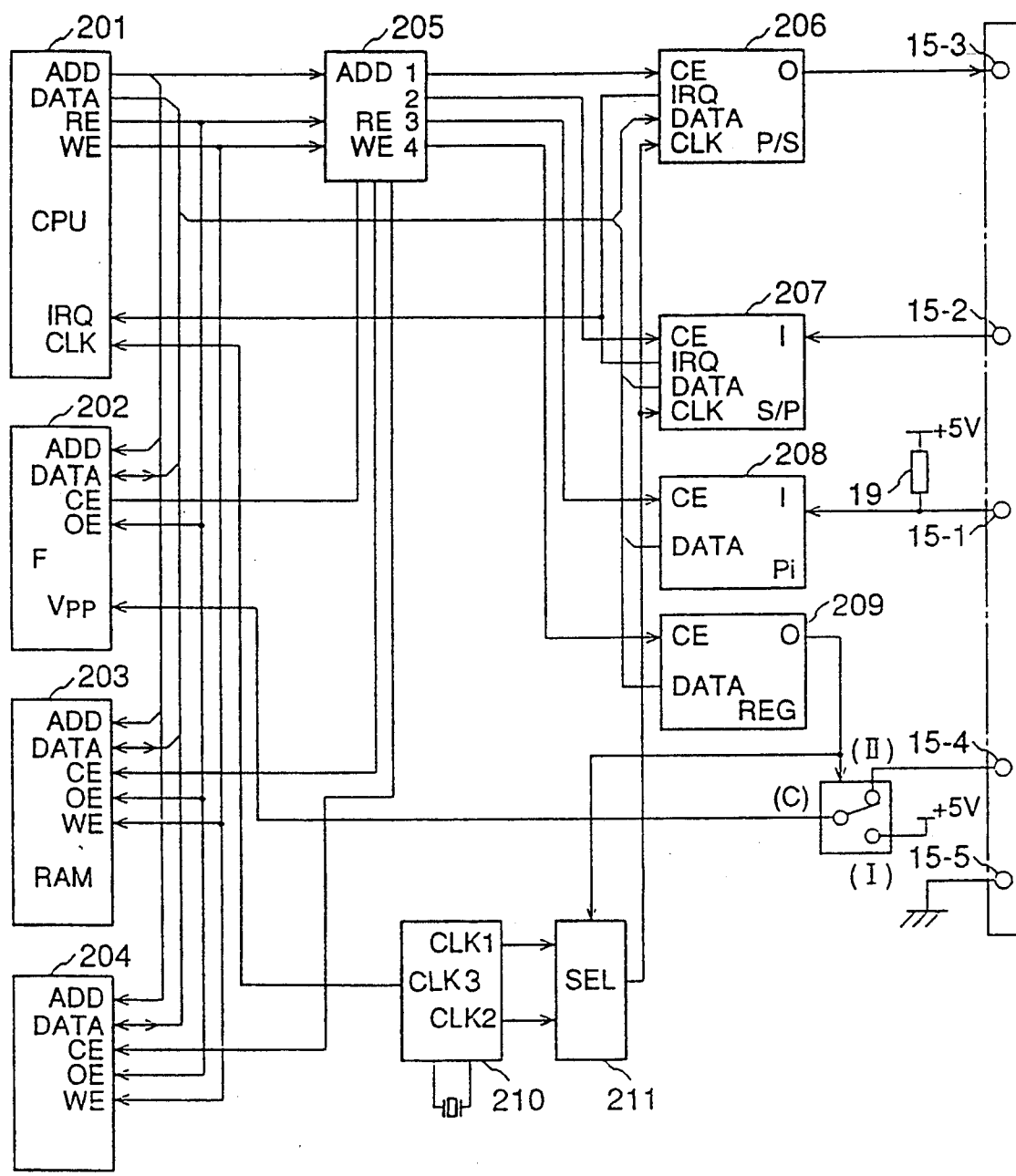
FIG. 2 is a circuit diagram illustrating a detailed structure of a control unit of the portable telephone shown in FIG. 1.

The control unit 20 is formed as shown in FIG. 2. Referring to FIG. 2, the control unit 20 is provided with a CPU (Central processing Unit) 201, a flash memory 202, a RAM (Random Access Memory) 203, an EEPROM (Electrically Erasable Programable ROM) 204, an address decoder 205, a parallel-to-serial converter 206, a serial-to-parallel converter 207, an input port 208 and an output register 209 all of which are connected to each other by a data bus. An address bus connects also the CPU 201, the flash memory 202, the RAM 203, the EEPROM 204 and the address decoder 205 to each other. The control unit 20 has also a clock generator 210, a selector 211 and a switching circuit 212. The CPU 201 controls operations of the portable telephone 10 in accordance with an operation program. The operation program is stored in an predetermined area (e.g. addresses $00000_H$ through $F0000_H$) of the flash memory 202. A program used for rewriting the operation program stored in the flash memory 202 is stored in another area (e.g. addresses $F000_H$ through $FFFFF_H$) of the flash memory 202. The program used for rewriting the operation program is often referred to as a debugging tool. Position data indicating a present position of the portable telephone 10, code data identifying other telephones and the like is stored in the EEPROM 204. The address decoder 205 supplies chip enable signals (CE) to the flash memory 202, the RAM 203, the EEPROM 204, the parallel-to-serial converter 206, the serial-to-parallel converter 207, the input port 208 and the output register 209 all of which are assigned to addresses to addresses. The address decoder 205 activates a chip enable signal to be supplied to a device (202, 203, 204, 206, 207, 208 or 209) corresponding to an address supplied from the CPU 201. The device receiving the active chip enable signal operates in accordance with instructions from the CPU 201. When the CPU 201 activates a write enable signal (WE), data in the data bus can be written in each of the flash memory 202, the RAM 203 and the EEPROM 204 so that data in each of memories 202, 203 and 204 can be rewritten. When the CPU 201 activates a read enable signal (RE), data stored in each of the flash memory 202, the RAM 203 and the EEPROM 204 can be read out to the data bus.

The clock generator 210 generates three clock signals CLK1, CLK2 and CLK3. The first and second clock signals CLK1 and CLK2 respectively correspond, for example, to rates of 600 bps (bit per second) and 9600 bps. The selector 211 selects either the first clock signal CLK1 or the second clock signal CLK2 in response to a control signal supplied from the output register 209. The clock signal selected by the selector 211 is supplied to the parallel-to-serial converter 206 and the serial-to-parallel converter 207 so that they operate in synchronism with the selected clock signal. The third clock signal CLK3 is supplied to the CPU 201, and the CPU 201 operates in synchronism with the third clock signal CLK3. The switching circuit 212 has a common terminal (C), a first switching terminal (I) and a second switching terminal (II). The switching circuit 212 selects either the first switching terminal (I) or the second switching terminal (II) in accordance with the control signal supplied from the output register 209. The common terminal (C) of the switching circuit 212 is connected to a power terminal $V_{pp}$ of the flash memory 202.

The connector 15 has terminals 15-1, 15-2, 15-3, 15-4 and 15-5. An input terminal of the input port 209, an input terminal of the serial-to-parallel converter 207 and an output terminal of the parallel-to-serial converter 206 are respectively connected to the terminals 15-1, 15-2 and 15-3 of the connector 15. The terminals 15-4 and 15-5 of the connector 15 are respectively connected to the second terminal (II) of the switch circuit 212 and the ground. The first terminal (I) of the switching circuit 212 is connected to a power line of +5 V. The terminal 15-1 of the connecter is connected to the power line of +5 V via a pull-up resistor 19.

The data supplied to the parallel-to-serial converter 206 is converted into serial data in synchronism with the clock signal, and the serial data is transmitted to an external unit via the terminal 15-3 of the connector 15. The serial data supplied from the external unit to the serial-to-parallel converter 207 via the terminal 15-2 of the connector is converted into parallel data, and the parallel data is supplied to the CPU 201 via the data bus.

Figure 5:
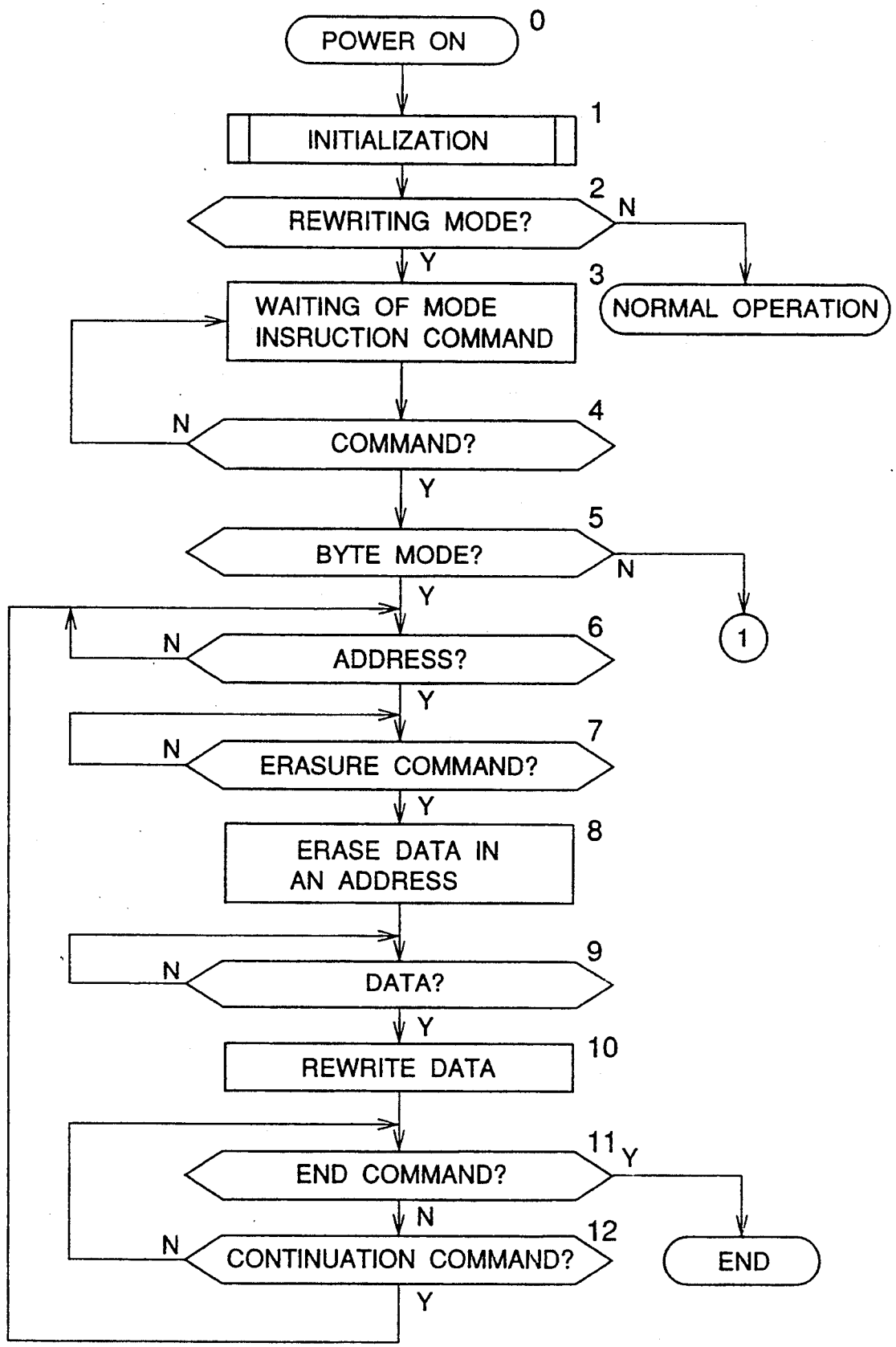
FIGS. 5 and 6 are flow charts illustrating processes for rewriting a program stored in the flash memory mounted in the portable telephone.

All the terminals 15-1 through 15-5 of the connector 15 are opened, and the portable telephone 10 can be in communication with other telephones. In this state, a voltage of +5 V is supplied from the power line to the input port 208, and a mode signal having a high level is set in the input port 208. The mode signal having the high level indicates a normal operation mode in which the portable telephone 10 can be in communication with other telephones. The mode signal having a low level indicates a test mode in which various tests of functions of the portable telephone 10 can be carried out and a rewriting mode in which the operation program in the flash memory 202 can be rewritten. In the above state, when the power supply 25 of the portable telephone 10 is turned on, the CPU 201 starts a process in accordance with the flow chart shown in FIG. 5. That is, the CPU 201 performs an initialization in step 1. After the initialization, in step 2, the CPU 201 determines whether the normal operation mode or the rewriting mode is to be activated with reference to the mode signal set in the input port 208. In this case, as the mode signal set in the input port 208 has the high level, the CPU 201 determines that the normal operation mode is to be activated in step 2. When the CPU 201 determines that the normal operation mode is to be activated, the CPU 201 reads out the operation program from the flash memory 202, and loads the operation program into the RAM 203. The CPU 201 then carries out a predetermined process for communicating with the other telephone in accordance with the operation program loaded in the RAM 203. That is, the personal telephone 10 operates in the normal mode.

Figure 3:
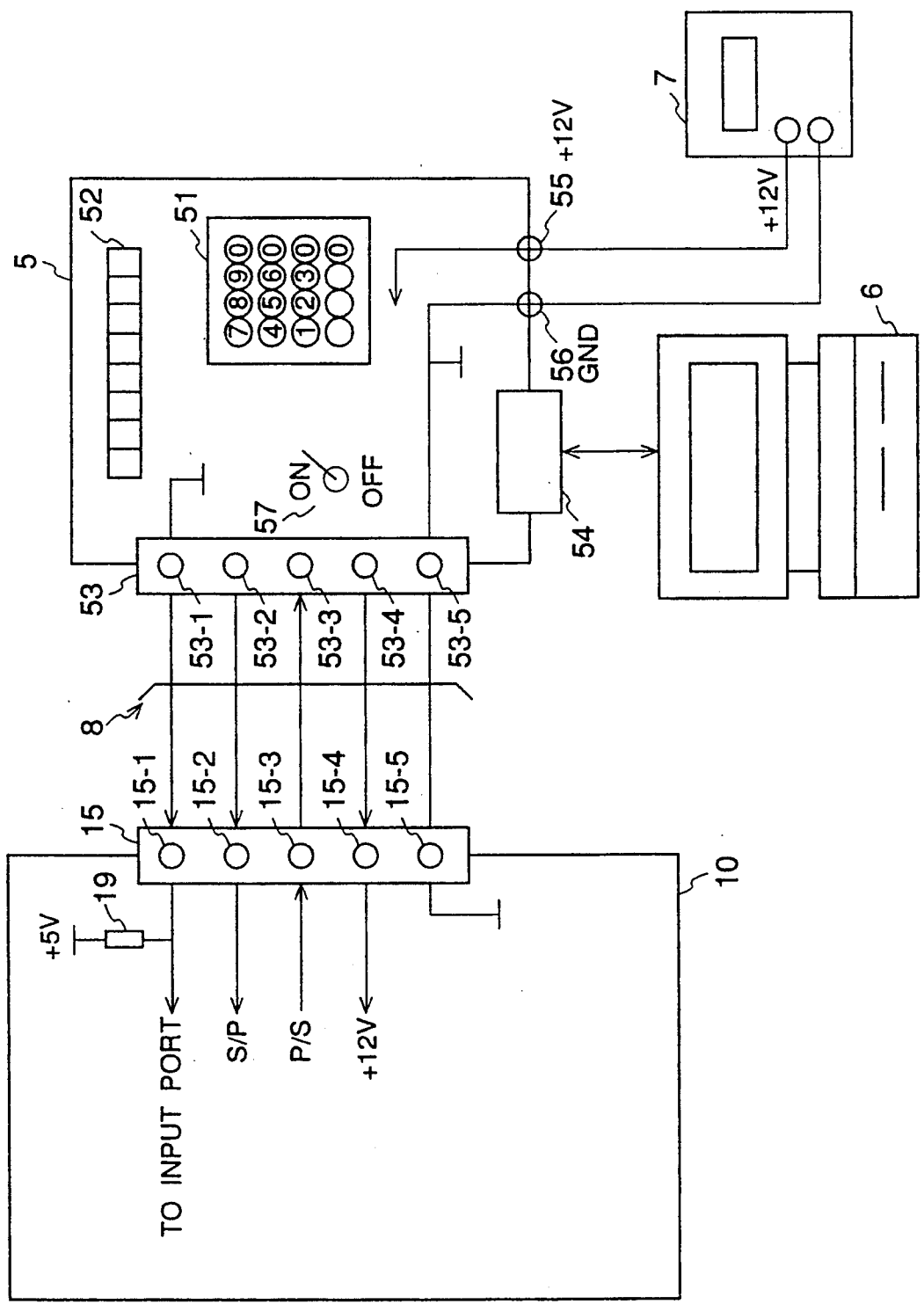
FIG. 3 is a block diagram illustrating a system for rewriting a program stored in a flash-memory provided in the control unit shown in FIG. 2.

To change functions of the portable telephone 10, the operation program stored in the flash memory 202 is rewritten. In this case, the portable telephone is connected to a ROM writer unit 5 as shown in FIG. 3. Referring to FIG. 3, the connector 15 of the portable telephone 10 is connected to a connector 53 of the ROM writer unit 5 by a cable 8 so that the terminals 15-1 through 15-5 of the portable telephone 10 are respectively connected to terminals 53-1 through 53-5 of the ROM writer unit 5. The ROM writer unit 5 also has terminals 55 and 56 connected to a stabilized power supply 7. A voltage of +12 V is supplied from the stabilized power supply 7 to the terminal 55, and the terminal 55 is connected to a ground terminal (GND) of the stabilized power supply 7. The ROM writer unit 5 has an interface (e.g. RS 232C) 54, and is connected to a computer terminal 6 via the interface 54. A display panel 52 for displaying various information, an input key board 51 for inputting data, instructions and other information, and a power switch 57 are provided on a panel of the ROM writer unit 5.

Figure 4:
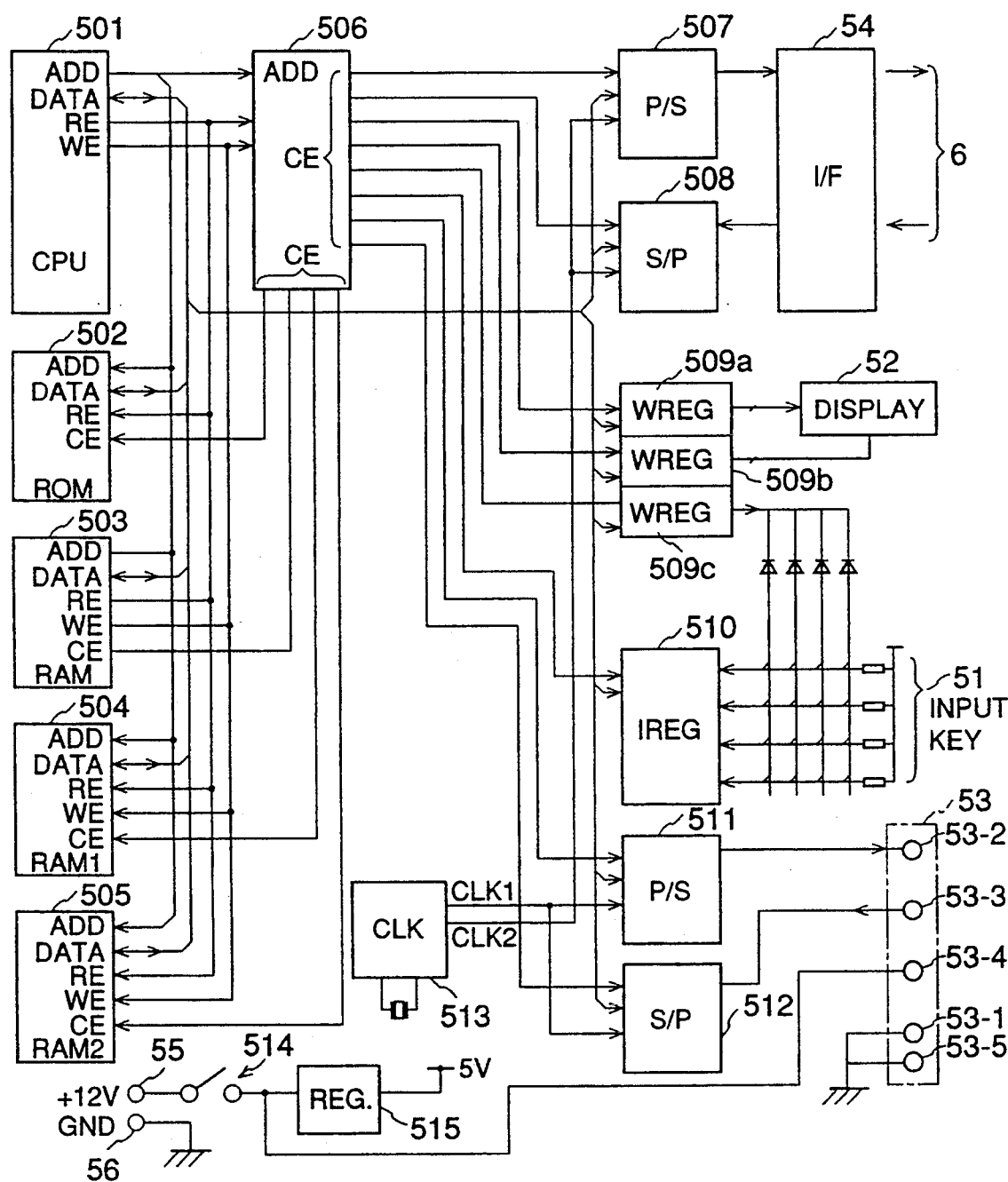
FIG. 4 is a circuit diagram illustrating a detailed structure of a rewriting unit, shown in FIG. 3, to be connected to the portable telephone.

The ROM writer unit 5 is formed as shown in FIG. 4. Referring to FIG. 4, the ROM writer unit 5 is provided with a CPU 501, a ROM 502, RAMs 503, 504 and 505, an address decoder 506, a parallel-to-serial converter 507, a serial-to-parallel converter 508, output registers 509a, 509b and 509c, an input register 510, a parallel-to-serial converter 511, and a serial-to-parallel converter 512 all of which are connected to each other by a data bus. The ROM 502 and the RAMs 503, 504 and 505 are connected to the CPU 501 by an address bus. The ROM writer unit 5 also has a clock generator 513 and a regulator 515 connected via a switch 514 to the terminal. 55 to which the voltage of +12 V is supplied. The terminal 56 is grounded. The regulator 515 supplies a regulated voltage +5 V to a power line in the ROM writer unit 5.

The CPU 501 controls operations of the ROM writer unit 5 in accordance with an operation program. The operation program is stored in the ROM 502. The address decoder 506 supplies chip enable signals (CE) to the ROM 502, the RAMs 503, 504 and 505, the parallel-to-serial converter 507, the serial-to-parallel converter 508, the output registers 509a, 506b and 509c, the input register 510, the parallel-to-serial converter 511, and the serial-to-parallel converter 512 to all of which addresses are assigned. The address decoder 506 activates a chip enable signal to be supplied to a device (502, 503, 504, 505, 507, 508, 209a, 509b, 509c, 510, 511, or 512) corresponding to an address supplied from the CPU 501. The device receiving the active chip enable signal operates in accordance with instructions from the CPU 501. When the CPU 501 activates a write enable signal (WE), data in the data bus can be written in each of the RAMs 503, 504 and 505. When the CPU 501 activates a read enable signal (RE), data stored in each of the ROM 202 and the RAMs 503, 504 and 505 can be read out to the data bus.

The clock generator 210 generates two clock signals CLK1 and CLK2. The first clock signal CLK1 is supplied to the parallel-to-serial converter 511 and the serial-to-parallel converter 512 so that they operate in synchronism with the first clock signal CLK1. The second clock signal CLK2 is supplied to the parallel-to-serial converter 507 and the serial-to-parallel converter 508 so that they operate in synchronism with the second clock signal CLK2.

The output registers 509a and 509b are connected to the display panel 52. The display panel 52 is controlled in accordance with data (4 bits) supplied from the CPU 501 and set in the output register 509a, and information indicated by data (8 bits) supplied from the CPU 501 and set in the output register 509b is displayed on the display panel 52. When keys on the input key board 51 are operated in a state where a predetermined data is set in the output register 509c, input data corresponding to the operation of the keys is set in the input register 510. The input data set in the input register 510 is supplied to the CPU 501 via the data bus.

An output terminal of the parallel-to-serial converter 511 and an input terminal of the serial-to-parallel converter 512 are respectively connected to the terminals 53-2, and 15-3 of the connector 53. The terminal 53-4 of the connector 53 is connected to the terminal 55 to which the voltage of +12 V via the switch 514, and the terminals 53-1 and 53-5 are grounded.

The terminals 53-1 through 53-5 of the connecter 53 are respectively connected to the terminals 15-1 through 15-5 of the connecter 15 of the portable telephone 10. The data supplied from the CPU 501 to the parallel-to-serial converter 206 is converted into serial data in synchronism with the first clock signal CLK1. The serial data output from the parallel-to-serial converter 511 is transmitted via the terminal 53-2 of the connecter 53, the cable 8 and the terminal 15-2 of the connecter 15 to the serial-to-parallel converter 207 of the portable telephone 10. The serial data output from the parallel-to-serial converter 206 of the portable telephone 10 is transmitted via the terminal 15-3 of the connecter 15, the cable 8 and the terminal 53-3 of the connecter 53 to the serial-to-parallel converter 512. The serial-to-parallel converter 512 converts the received serial data into parallel data, and the parallel data is supplied to the CPU 501 via the data bus.

The parallel-to-serial converter 507 and the serial-to-parallel converter 508 are connected to the computer terminal 6 via the interface 54 (RS-32C). That is, data is sent to or received from the computer terminal 6 via the parallel-to-serial converter 507 or the serial-to-parallel converter 508 and the interface 54.

In a state where the portable telephone 10 is connected to the ROM writer unit 5, the terminal 15-1 of the connector 15 of the portable telephone 10 is connected to the ground via the terminal 53-1 of the connector 53 of the ROM writer unit 5. Thus, the mode signal having the low level is set in the input register 208 of the portable telephone 10.

In the portable telephone 10, the process is performed in the same manner as that in the normal mode described above until step 2 shown in FIG. 5. Here, since the mode signal set in the input register 208 has the low level, the CPU 201 determines, in step 2, that the rewriting mode is to be activated. That is, the portable telephone 10 starts a process in the rewriting mode. At this time, the switch circuit 212 is switched from the fist terminal. (I) to the second terminal (II), so that the voltage of +12 V is supplied to a power terminal $V_{pp}$ of the flash memory 202 from the ROM writer unit 5 via the terminal 53-4, the terminal 15-4 of the connector 15 of the portable telephone 10 and the switch circuit 212.

The CPU 201 awaits an instruction command from the ROM writer unit 5 in step 3 while determining, in step 4, whether or not the instruction command is received. The instruction command may be of two types; a first type called "byte mode instruction" and a second type called "page mode instruction". The "byte mode instruction" is an instruction by which data in one address of the flash memory 202 is rewritten. The "page mode instruction" is an instruction by which data in the flash memory 202 is rewritten page by page.

Figures 7, 8:
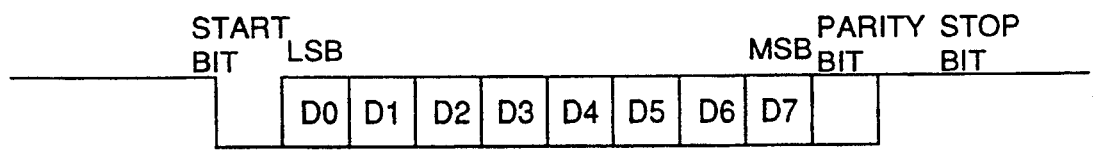
FIG. 7 is a diagram illustrating a format of a serial signal.
FIG. 8 is a table illustrating examples of commands.

An operator turns on the power switch 57 of the ROM writer unit 5, and inputs a command via the input key board 51. The CPU 501 of the ROM writer unit 5 converts the command into a serial command signal having a format as shown in FIG. 7. The serial command signal is transmitted via the terminal 53-2 of the connector 53 to the portable telephone 10. The serial command signal transmitted from the ROM writer unit 5 is input via the terminal 15-2 to the portable telephone 10. FIG. 8 shows examples of commands. Referring to FIG. 8, code data "$01_H$" indicates the byte mode instruction, code data "$02_h$" indicates the page mode instruction, and code data "$03_H$" indicates an end command for ending a process. Furthermore, code data "$04_H$" indicates a continuation command for continuing a process, code data "$05_H$" indicates an erasure command for erasing information from a memory, code data "$06_H$" indicates a input command for inputting data, code data "$07_H$" indicates a programming command for rewriting a program in the flash memory, code data "$08_H$" indicates a verification command for verifying a program rewritten in the flash memory, and code data "$FF_H$" indicates a reset command.

Returning to FIG. 5, in step 4, commands other than the page mode instruction command, the byte mode instruction command and the end command are disregarded. When the CPU 202 determines that one of the instruction commands; the page mode command, the byte mode command and the end command, has been received, it is determined, in step 5, whether or not the received instruction command is the byte mode instruction. When it is determined that the received instruction command is the byte mode instruction, the data in the flash memory 202 is rewritten in the byte mode in the following manner.

In step 6, the CPU 201 waits for address data to be input. When the operator inputs address data from the input key board 51 of the ROM writer 5, the address data indicating an address at which data is to be rewritten in the flash memory 202, the address data is supplied from the ROM writer 5 to the portable telephone 10 via the terminal 53-2. The address data received in the portable telephone via the terminal 15-2 10 is supplied to the RAM 203 via the serial-to-parallel converter 207 and the CPU 201, and temporally stored in the RAM 203. Then, when the CPU 201 determines that the address has been input, the CPU 201 waits, in step 7, for the erasure command "$05_H$" to be input. Until the erasure command "$05_H$" is input, the data in the flash memory 202 is not erased therefrom. When the CPU 201 determines that the erasure command "$05_H$" has been input by the operator, in step 8, the CPU 201 instructs the flash memory 202 to erase data in the address identified by the above address data stored in the RAM 203. In accordance with this instruction, the data (byte data) in the address identified by the address data is erased from the flash memory 202. When the erasing of the data for one byte from the flash memory 202 is completed, the CPU 201 outputs an acknowledgement signal (ACK), and the acknowledgement signal is serially output via the parallel-to-serial converter 206 and the terminal 5-3. The acknowledgement signal is supplied to the ROM writer 5. When the ROM writer 5 receives the acknowledgement signal, the code data "$05_H$" is displayed on the display panel 52, the code data "$05_H$" indicating that the data in the address identified by the address data has been erased from the flash memory 202. FIG. 8 shows code data indicating various information corresponding to commands.

After the data is erased from the flash memory 202, the CPU 12 awaits, in step 9, for new data to be written in the address from which the data has been erased. When the CPU 201 determines that the data is input by the operator, the CPU 201 supplies a rewrite command to the flash memory 202 in step 10. In accordance with the rewrite command, the input data is written in the address from which the data has been erased. When the writing of the data in the flash memory 202 is completed, the CPU 201 outputs the acknowledgement signal (ACK). In the ROM writer 5, input data to be written in the flash memory 202 and the information indicating that the input data has been written in the flash memory 202 are displayed on the display panel 52 in the same manner as in a case of the erasing of the data.

In accordance with the above procedures, the rewriting of one byte data is completed. After this, the CPU 201 determines, in steps 11 and 12, whether or not either the end command "$03_H$" or the continuation command "$04_H$" is input If the continuation command "$04_H$" is input by the operator in the ROM writer 5, steps 6–12 are repeated and a next byte of data is rewritten in the flash memory 202 in the same manner as in the above process. On the other hand, if the end command is input, the process in the byte mode is completed.

Figure 6:
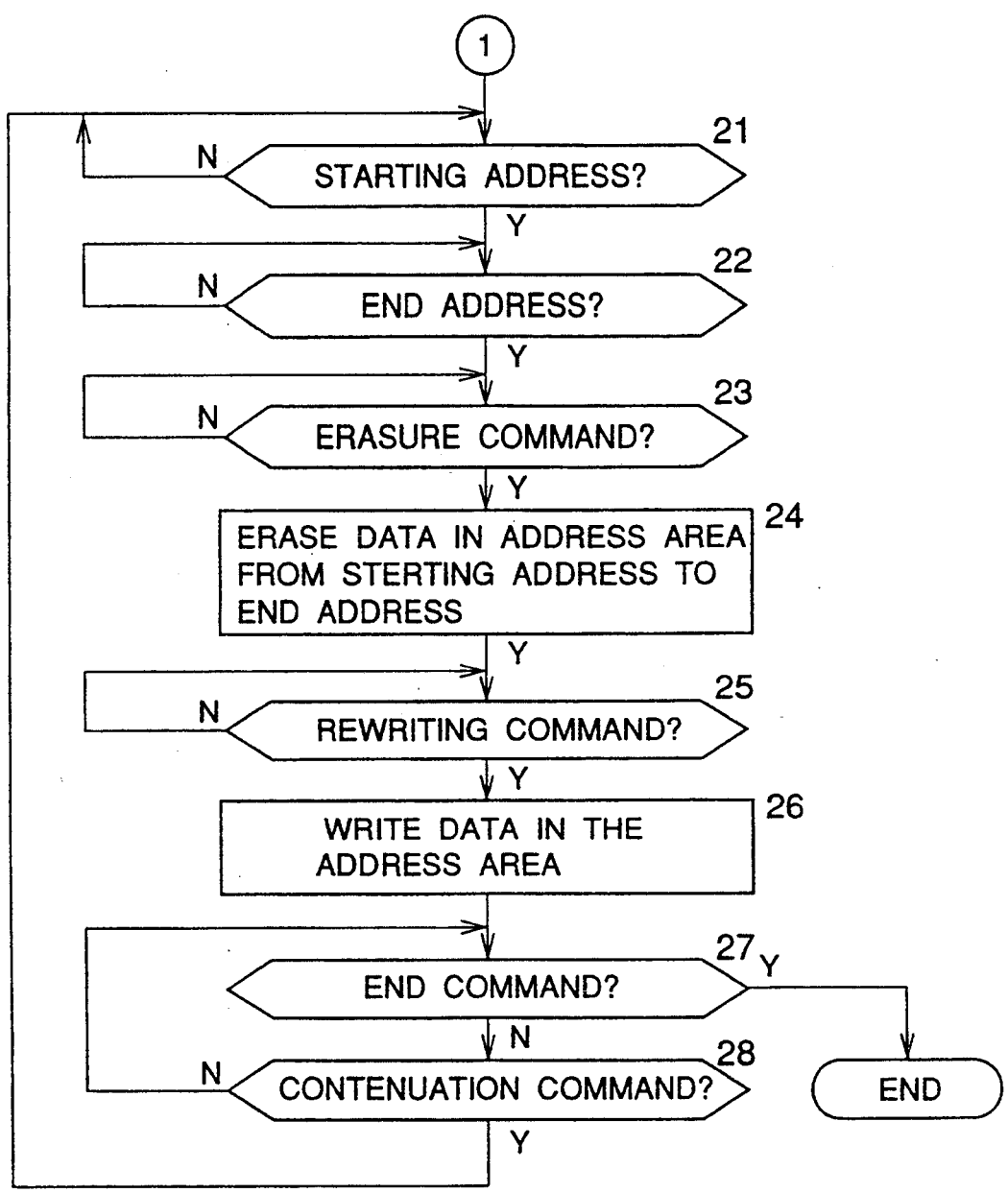

When, in step 5, it is determined that the received instruction command is the page mode instruction command, the process proceeds to step 21 shown in FIG. 6. The data in the flash memory 202 is rewritten in the page mode as in the following. In the page mode, data in an address area in which data is to be rewritten has been previously input from the computer terminal 6 to the ROM writer 5 via the interface 54 (RS-32C) and the data has been stored in the RAMs 504 and 505.

In step 21, the CPU 201 waits for an starting address of the address area in which the data is to be rewritten to be input by the operator. When the starting address is input, the CPU 201 waits, in step 22, that an end address of the address area is input by the operator. When the end address is input, the CPU 201 further waits, in step 23, for the erasure command "$05_H$" is input by the operator. When the erasure command "$05_H$" to be input, all the data in the address area identified by the starting address and the end address is erased from the flash memory 202, in step 24. After all the data in the address area is erased from the flash memory 202, the CPU 201 waits, in step 25, for a command (the programming command "$07_H$") for rewriting data is input by the operator. When the programming command to be input, in step 26, the data stored in the RAMs 504 and 505 are written in the address area of the flash memory 202 from which the data has been erased in step 24. When the writing of the data in the flash memory 202 is completed, it is determined, in steps 27 and 28, whether or not the end command and the continuation command are input in the same manner as in the byte mode described above. If the continuation command is input, steps 21-28 are repeated and the data for the next address area is rewritten in the flash memory 202. On the other hand, if the end command is input, the process in the page mode is completed.

Figure 9:
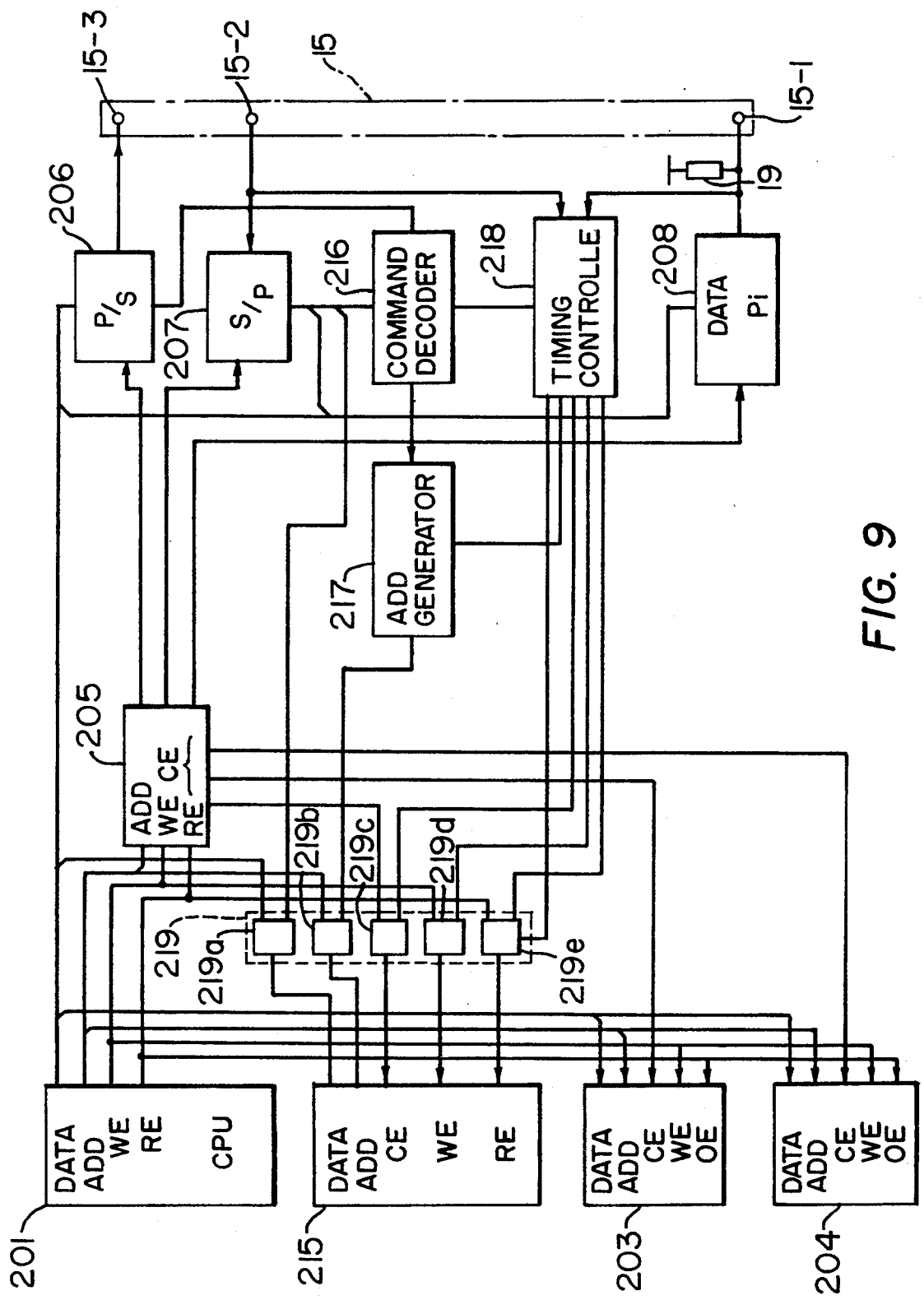
FIG. 9 is a circuit diagram illustrating another example of the control unit of the portable telephone shown in FIG. 1.

The control unit 20 may be constituted as shown in FIG. 9. In FIG. 9, those parts which are the same as those shown in FIG. 2 are given the same reference numbers.

In the control unit 20 shown in FIG. 9, the operation program is stored in an EEPROM 215, and is rewritten by a program rewriting circuit (a hardware).

Referring to FIG. 9, the parallel-to-serial converter 206, the serial-to-parallel converter 207 and the input port 208 are respectively connected to the terminals 15-3, 15-2 and 15-1 of the connector 15 in the same manner as those shown in FIG. 2. The terminal 15-1 is connected to the power line +5 V via the pull-up resistor 19. The rewriting circuit is formed of a command decoder 216, an address generator 217, a timing controller and a selector circuit 219. The command decoder 216 receives commands transmitted from the ROM writer 5 via the serial-to-parallel converter 207, and analyzes the received commands. The address generator 217 generates addresses to be supplied to the EEPROM 215 based on decoded signals from the command decoder 216. The timing circuit 218 inputs data supplied from the ROM writer 5 via the terminal 15-2 and a mode signal from the terminal 15-1. The timing controller 218 then outputs various timing signals based on the decoded signals from the command decoder 216. The selector circuit 219 has five selectors 219a, 219b, 219c, 219d and 219e. The selector 219a selects either a first input data from the data bus or a second input data from the serial-to-parallel converter 207. The selected data output from the selector 219a is supplied to the data port (DATA) of the EEPROM 215. The selector 219b selects either a first address from the address bus or a second address from the address generator 217. The selected address output from the selector 219b is supplied to the address port (ADD) of the EEPROM 215. The selector 219c selects either a first chip select signal (CE) from the address decoder 205 or a second write chip select signal (ROM CE) from the timing controller 218. The selector 219d selectors either a first write enable signal (WE) from the CPU 201 or a second write enable signal (ROM WE) from the timing controller 218. The selector 219e selects either a first read enable signal (RE) from the CPU 201 or a second read enable signal (ROM RE) from the timing controller 218. The selected signals output from the selectors 219c, 219d and 219e are supplied to the EEPROM 125. The selecting operation of the selectors 219a-219d is controlled by a control signal (SEL.CONTROL) supplied from the timing controller 218.

Figure 10:
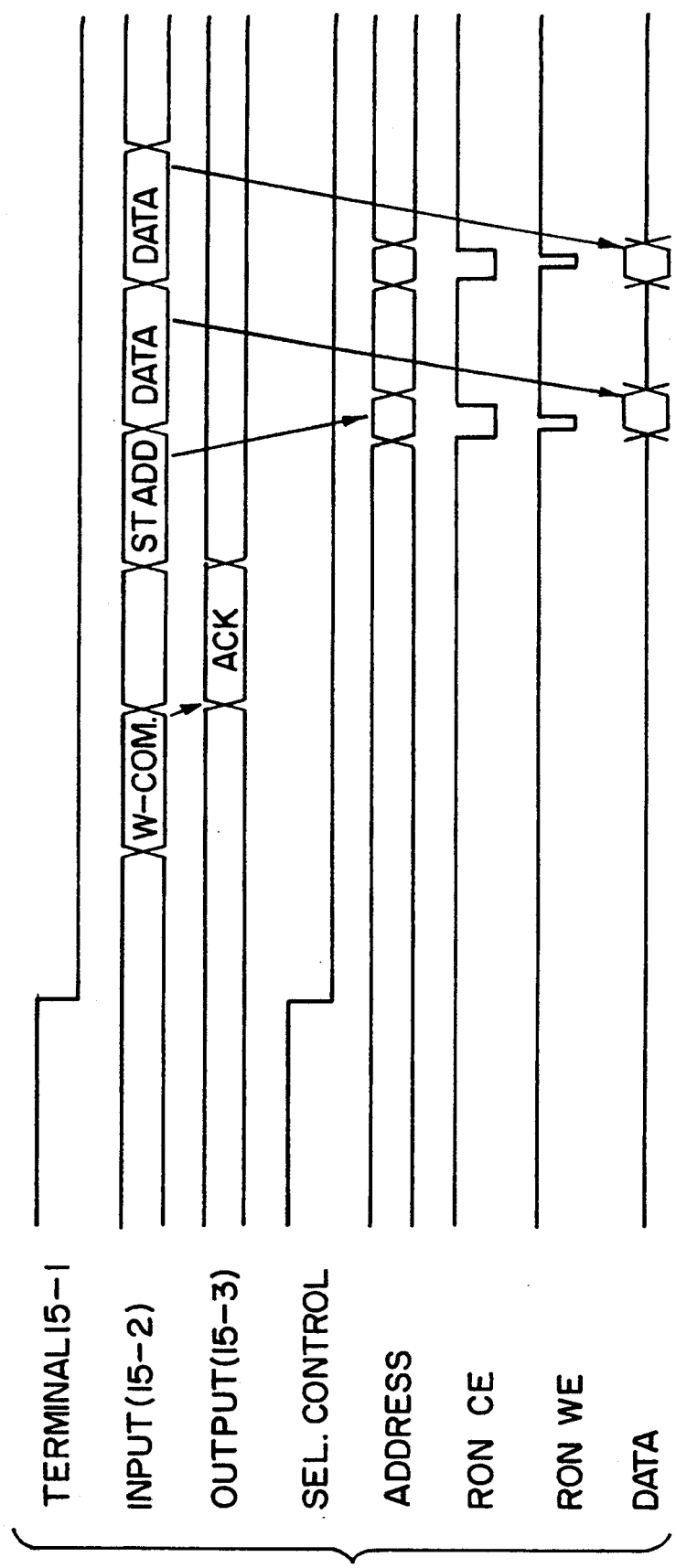
FIG. 10 and FIG. 11 are timing charts illustrating operations of the control unit shown in FIG. 9.

When the portable telephone 10 is connected to the ROM writer 5 by the connector 15, the operation in the rewriting mode (the programing mode) is performed as shown in FIG. 10. Referring to FIG. 10, when the mode signal (the terminal 15-1) becomes a low level (the program mode), the CPU 201 is reset and stops the operation. At this time, the control signal (SEL. CONTROL) supplied to the selector circuit 219 becomes a low level, so that the selectors 219a-219e respectively selects the second data, the second address and the second signals. The write command (W-COM) is supplied from the ROM writer 5 via the terminal 15-2. When the command decoder 216 receives the write command (W-COM), a response signal (ACK) is output from the command decoder 216, and is transmitted to the ROM writer 5. After this, a start address supplied from the ROM writer 5 is supplied to and loaded in the address generator 217 via the command decoder 216. The start address is supplied from the address generator 217 to the EEPROM 215 via the selector 219b. The chip select signal (ROM CE) and the write enable signal (ROM WE) is then activated and supplied from the timing controller 218 to the EEPROM 215. In this state, the data received by the serial-to-parallel converter 207 is supplied to the data bus via the selector 219a, and the data is written at the start address in the EEPROM 215. After this, the address generator 217 generates addresses at predetermined timing, and the data supplied from the ROM writer 5 is successively written at the generated addresses of the EEPROM 215. As a result, the operation program stored in the EEPROM 215 is rewritten.

Figure 11:
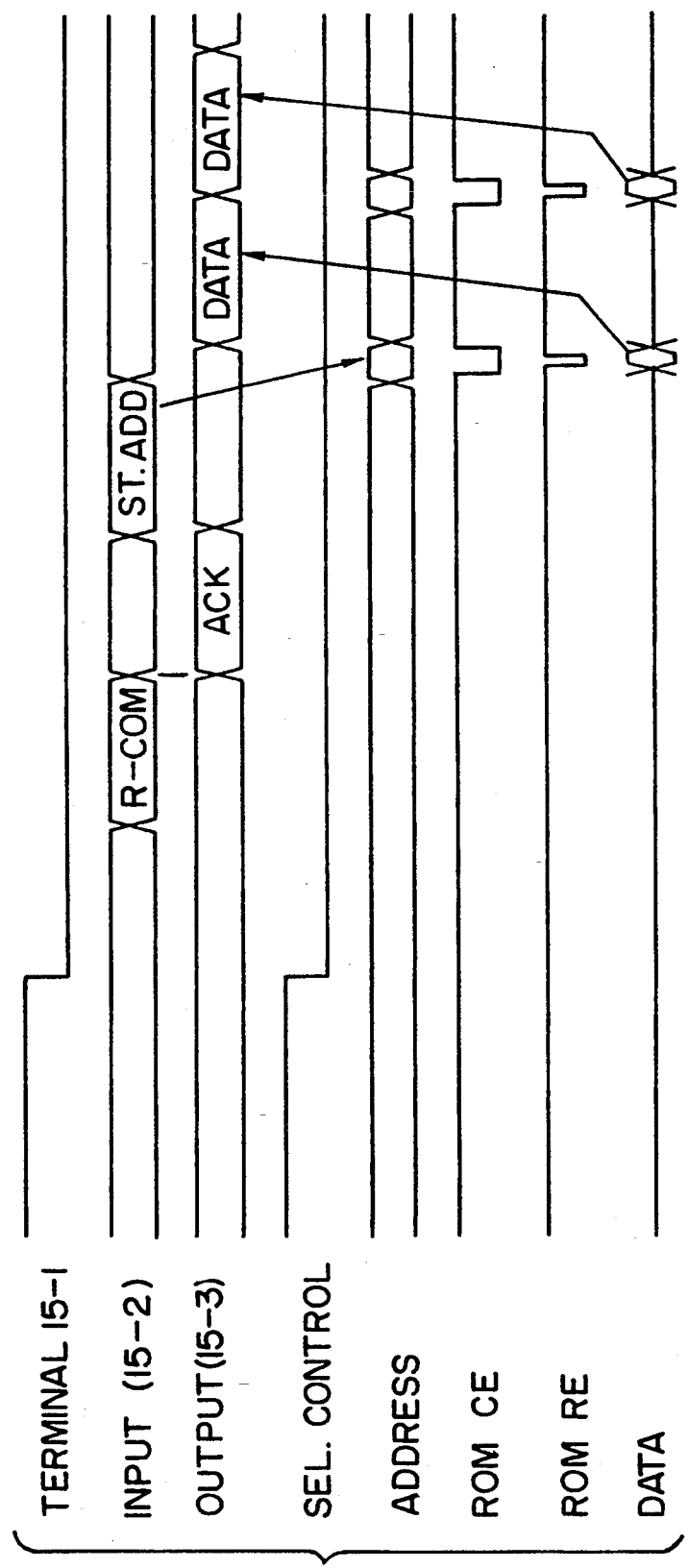

The read operation of the EEPROM 215 is performed as shown in FIG. 11. In this case, after the mode signal (the terminal 15-1) and the control signal supplied to the selector circuit 219 become the low level, the read command (R-COM) is supplied from the ROM writer 5. The command decoder 218 outputs the response signal (ACK) in response to the read command (R-COM). After this, the address generator 217 outputs the start address (ST.ADD) supplied from the ROM writer 5, and the start address (ST.ADD) and the chip select signal (ROM CE) and the read enable signal (RE) both of which signals output from the timing controller 218 are supplied to the EEPROM 215 via the selectors 219a, 219c and 219e. The data is then read out from the start address of the EEPROM 215 and is supplied to the serial-to-parallel converter 206. The data is transmitted from the portable telephone 10 to the ROM writer 5 via the terminal 15-3. After this, the address generator 217 successively generates addresses, and the data is read out from the generated addresses of the EEPROM 215, and is transmitted to the ROM writer 5.

In the normal mode, the mode signal and the control signal (SEL.CONTROL) have a high level. The selectors 219a–219e select the first data, the first address and the first signals, so that the normal operation is performed in the same manner as in the case described above with reference to FIG. 2.

The present invention is not limited to the aforementioned embodiments, and variations and modifications may be made without departing from the scope of the claimed invention.

What is claimed is:

1. A system comprising:
   a portable remote terminal for communicating with other terminal devices; and
   an external unit for supplying data to said portable remote terminal, said portable remote terminal including:
     a connector for connecting said portable remote terminal to said external unit;
     rewritable memory means for storing first information used in said portable remote terminal;
     debugging tool memory means for storing a first program for rewriting said first information stored in said rewritable memory means; and
     rewriting means, coupled to said rewritable memory means and to said debugging tool memory means, for rewriting the first information stored in said rewritable memory means in correspondence with information supplied from said external unit via said connector, said rewriting being effected in accordance with said first program stored in said debugging tool memory means.

2. The system as in claim 1, wherein the first information to be rewritten, stored in said rewritable memory means, is a second program in accordance with which said portable remote terminal operates.

3. The system as in claim 1, wherein said debugging tool memory means and said rewritable memory means are respective areas of a first memory.

4. The system as in claim 1, wherein said connector means has a first connecting terminal provided with a signal having a first level in an open state of said first connecting terminal, and said first connecting terminal being provided with a signal having a second level when said external unit is connected thereto, said rewriting means determining that the first information stored in said rewritable memory means is to be rewritten when said signal of said second level is applied to said first connecting terminal.

5. The system as in claim 1, wherein said rewritable memory means is alternatively provided with a first voltage for a reading operation and a second voltage for a writing operation, said connector having a second connecting terminal through which the second voltage is supplied to said rewritable memory means.

6. The system as in claim 3, wherein said first memory is a flash memory.

7. The system as in claim 1, wherein said rewriting means rewrites one byte of said first information to correspond with one byte of data input by said external unit.

8. The system as in claim 1, wherein said rewriting means rewrites a predetermined address area of said first information in said rewritable memory means to correspond with data input by said external unit.

9. The system as in claim 8, wherein said external unit has a second memory for storing data to be input to said portable remote terminal by said external unit, data in a predetermined address area of said rewritable memory means being rewritten to correspond with said data stored in said second memory.

10. The system as in claim 1, wherein said rewriting means has first means for rewriting information for one byte to correspond with a one byte of data input by said external unit, second means for rewriting information in a predetermined address area of said rewritable memory means to correspond with data input by said external unit, and selecting means for selecting either said first means for rewriting or said second means for rewriting in accordance with an instruction input to said portable remote terminal by said external unit.

11. The system as in claim 1, wherein said external unit has display means for displaying information input to said remote portable terminal by said external unit.

12. The system as in claim 1, wherein said portable remote terminal is a portable telephone.

13. A portable remote terminal for communicating with other terminal devices, said portable remote terminal comprising:
    a connector for connecting said portable remote terminal to an external unit;
    rewritable memory means for storing first information used in said portable remote terminal,
    debugging tool memory means for storing a first program for rewriting the first information stored in said rewritable memory means, and
    rewriting means, coupled to said rewritable memory means and to said debugging tool memory means, for rewriting the first information stored in the rewritable memory means in accordance with second information, input by said external unit via said connector, the rewriting being effected in accordance with said first program stored in said debugging tool memory means.

14. The portable remote terminal as in claim 13, wherein the first information to be rewritten is a second program by which said portable remote terminal operates.

15. The portable remote terminal as in claim 13, wherein said debugging tool memory means and said rewritable memory means are respective areas of a first memory.

16. The portable remote terminal as in claim 13, wherein said connector means has a first connecting terminal provided with a signal having a first level in an open state of said first connecting terminal and said first connecting terminal being provided with a signal having a second level when said external unit is connected thereto, said rewriting means determining that the first information stored in said rewritable memory means is to be rewritten when said signal of said second level is applied to said first connecting terminal.

17. The portable remote terminal as in claim 13, wherein said rewritable memory means is alternatively provided with a first voltage for a reading operation and a second voltage for a writing operation, said connector having a second connecting terminal through which the second voltage is supplied to said rewritable memory means.

18. The portable remote terminal as in claim 15, wherein said first memory is a flash memory.

19. The portable remote terminal as in claim 13, wherein said rewriting means has first means for rewriting one byte of said first information to correspond with one byte of data input by said external unit.

20. The portable remote terminal as in claim 13, wherein said rewriting means has second means for rewriting a predetermined address area of said first information in said rewritable memory means to correspond with data input by said external unit.

21. The portable remote terminal as in claim 13, wherein said rewriting means has first means for rewriting information for one byte to correspond with one byte of data input by said external unit, second means for rewriting information in a predetermined address area of said rewritable memory means to correspond with data input by said external unit, and selecting means for selecting either said first means for rewriting or said second means for rewriting in accordance with an instruction input to said portable remote terminal by said external unit.

* * * * *